US009223976B2

(12) United States Patent
Risney, Jr. et al.

(10) Patent No.: US 9,223,976 B2
(45) Date of Patent: Dec. 29, 2015

(54) CONTENT INSPECTION (75) Inventors: David L. Risney, Jr., Redmond, WA (US); Scott B. Graham, Seattle, WA (US); David Andrew Ross, Redmond, WA (US); Mathias Jourdain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 13/228,338

(22) Filed: Sep. 8, 2011

(65) Prior Publication Data

US 2013/0067570 A1  Mar. 14, 2013

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/56* | (2013.01) | |
| *H04L 29/06* | (2006.01) | |
| *G06F 21/62* | (2013.01) | |

(52) U.S. Cl.
CPC ............ *G06F 21/566* (2013.01); *G06F 21/629* (2013.01); *H04L 63/107* (2013.01); *H04L 63/126* (2013.01); *H04L 63/14* (2013.01); *G06F 2221/2141* (2013.01)

(58) Field of Classification Search
CPC ............ H04L 63/1441; H04L 63/1433; H04L 63/1483; H04L 63/145; H04L 63/14; H04L 63/1408; H04L 63/1416; G06F 21/56; G06F 21/563; G06F 21/562; G06F 21/566; G06F 21/577
USPC ..................................................... 726/22–25
See application file for complete search history.

(56) References Cited

U.S. PATENT DOCUMENTS

| 7,051,366 | B1 * | 5/2006 | LaMacchia et al. ............ 726/14 |
| 7,308,648 | B1 * | 12/2007 | Buchthal et al. .............. 715/234 |
| 7,774,620 | B1 * | 8/2010 | Stott et al. ..................... 713/193 |
| 8,037,527 | B2 * | 10/2011 | Milener ............ G06F 17/30902 713/188 |
| 8,220,050 | B2 * | 7/2012 | Sarathy ................. G06F 21/567 709/224 |
| 2004/0260754 | A1 | 12/2004 | Olson et al. |
| 2006/0037082 | A1 * | 2/2006 | LaMacchia et al. ............ 726/27 |
| 2006/0070112 | A1 * | 3/2006 | LaMacchia et al. .............. 726/1 |
| 2007/0156871 | A1 | 7/2007 | Braun et al. |
| 2008/0263650 | A1 | 10/2008 | Kerschbaum |

(Continued)

OTHER PUBLICATIONS

Saxena, et al., "Scriptgard: Preventing Script Injection Attacks in Legacy Web Applications with Automatic Sanitization", Retrieved at <<http://research.microsoft.com/en-us/-/um/people/livshits/papers/tr/scriptgard_tr.pdf>>, Microsoft Research Technical Report, Oct. 1, 2010, pp. 1-16.

*Primary Examiner* — Tae Kim
(74) *Attorney, Agent, or Firm* — Kevin Sullivan; Kate Drakos; Micky Minhas (57) ABSTRACT

Content inspection techniques are described. In one or more implementations, it is detected that an application executing on a computing device is calling a particular code element of a group of code elements to be used to process content. For example, the group of code elements can include a pre-specified group of code elements (e.g., functions and/or properties) that may enable access to particular functionalities of a computing device and thus are associated with a known security risk. It is then ascertained that the content is untrusted and, in response to ascertaining that the content is untrusted, the content is inspected to determine if the content is safe to be passed to the code element.

20 Claims, 5 Drawing Sheets

(56) References Cited

U.S. PATENT DOCUMENTS

| | | |
|---|---|---|
| 2008/0320567 A1 | 12/2008 | Shulman et al. |
| 2009/0064337 A1* | 3/2009 | Chien .............................. 726/25 |
| 2009/0070869 A1 | 3/2009 | Fan et al. |
| 2009/0119769 A1* | 5/2009 | Ross et al. ...................... 726/13 |
| 2009/0249482 A1* | 10/2009 | Sarathy ................. G06F 21/567 726/22 |
| 2009/0249484 A1* | 10/2009 | Howard ................ G06F 21/567 726/24 |
| 2009/0249489 A1* | 10/2009 | Livshits et al. ................. 726/26 |
| 2010/0186089 A1* | 7/2010 | Fu et al. ......................... 726/23 |
| 2010/0257603 A1* | 10/2010 | Chander et al. ................. 726/22 |

* cited by examiner

CONTENT INSPECTION

BACKGROUND

Today's computer user has access to a wide variety of content, such as video content, audio content, text content, and so on. Not all content, however, is safe to be consumed on a computing device. For example, some content may include malicious executable code (e.g., malware) that, when executed, may gain unauthorized access to particular portions of a computing device and/or private information about a user.

While techniques exist for preventing malicious executable code from gaining such unauthorized access, these techniques typically do not take into account the desires of today's content developer. For example, a content developer may develop an application that can access remote content (e.g., web content) via a computing device. Current techniques do not typically consider how such remote content will be processed via the computing device in determining if the remote content will be allowed access to the computing device. Further, current techniques do not typically enable the content developer to specify that specific instances of remote content are to be allowed access to a computing device.

SUMMARY

Content inspection techniques are described. In one or more implementations, it is detected that an application executing on a computing device is calling a particular code element of a group of code elements to be used to process content. For example, the group of code elements can include a pre-specified group of code elements (e.g., functions and/or properties) that are associated with a known security risk. It is then ascertained that the content is untrusted and, in response to ascertaining that the content is untrusted, the content is inspected to determine if the content is safe to be passed to the code element. In implementations, unsafe content can include executable code retrieved from a remote resource that can be executed on the computing device. If the content is determined to be safe to be passed to the code element, the content can be passed to the particular code element for processing. If the content is determined to be unsafe, however, the content can be blocked from being passed to the particular code element.

In one or more implementations, a computing device detects a call from an application to a code element of a pre-specified group of code elements to be used to process untrusted content. For example, the computing device may detect that the call to the code element references content that is external to known trusted data of the computing device. The untrusted content is allowed to be passed to the code element without being inspected in response to a determination that the call to the code element is opting out of content inspection. The application, for instance, may include instructions that content inspection functionality of the computing device is to be bypassed for the call to the code element.

In one or more implementations, it is ascertained that content is untrusted based on a source of the content and, responsive to ascertaining that the content is untrusted, the content is inspected to determine that the content is unsafe to be passed to a pre-specified code element. The content is sanitized by removing one or more unsafe features from the content prior to allowing the content to be passed to the pre-specified code element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Computing devices may have access to a wide variety of content from a wide variety of sources. Some sources, however, may be unknown and thus content from such sources may not be trusted. Further, some types of content are inherently associated with a security risk and thus care should be taken before allowing such content to access certain portions of a computing device.

In certain scenarios, a user (e.g., an application developer) may want to access content from an unknown source. For example, the user may write an application that, when executed on a computing device, attempts to access content from a resource that is remote from and/or unknown to the computing device. Such content may include text content, pictures, video, audio, and so on. Techniques discussed herein enable such content to be inspected to prevent the content from enabling unauthorized access to portions and/or functionalities of a computing device.

Accordingly, content inspection techniques are described. In one or more implementations, techniques may be employed to reduce a likelihood that malicious code (e.g., malware) can access vulnerable portions of a computing device. This may be performed in a variety of ways, such as by pre-specifying a set of code elements (e.g., functions, properties, and/or interfaces) on a computing device and inspecting untrusted content to determine if the untrusted content is safe before it can access one of the pre-specified code elements. In implementations, the set of code elements can be pre-specified based on whether the code elements enable access to security-sensitive functionalities of the computing device. If the content is determined to be unsafe, the content may be denied access to one of the code elements. Conversely, if the content is determined to be safe and/or trusted, the content may be granted access to one or more code elements of the set of code elements.

Further, techniques may be employed to enable a call to a particular code element to opt out of a content inspection scheme. For example, a computing device may determine that a call to a code element includes an indication that content associated with the call is to be exempted from a content inspection scheme. Thus, the code element can be executed using the content without first inspecting the content to determine if the content is unsafe. For example, a developer may reference content in an application that the developer knows to be safe even though content inspection techniques discussed herein may consider the content unsafe. This can enable a developer to bypass content inspection mechanisms in situations where the content may be rejected if inspected.

In the following discussion, an example environment is first described that is operable to employ content inspection techniques described herein. Example procedures involving content inspection techniques are then described which may be employed in the example environment as well as in other environments. Accordingly, the example environment is not limited to performing the example procedures. Likewise, the example procedures are not limited to implementation in the example environment.

Example Environment

Figure 1:
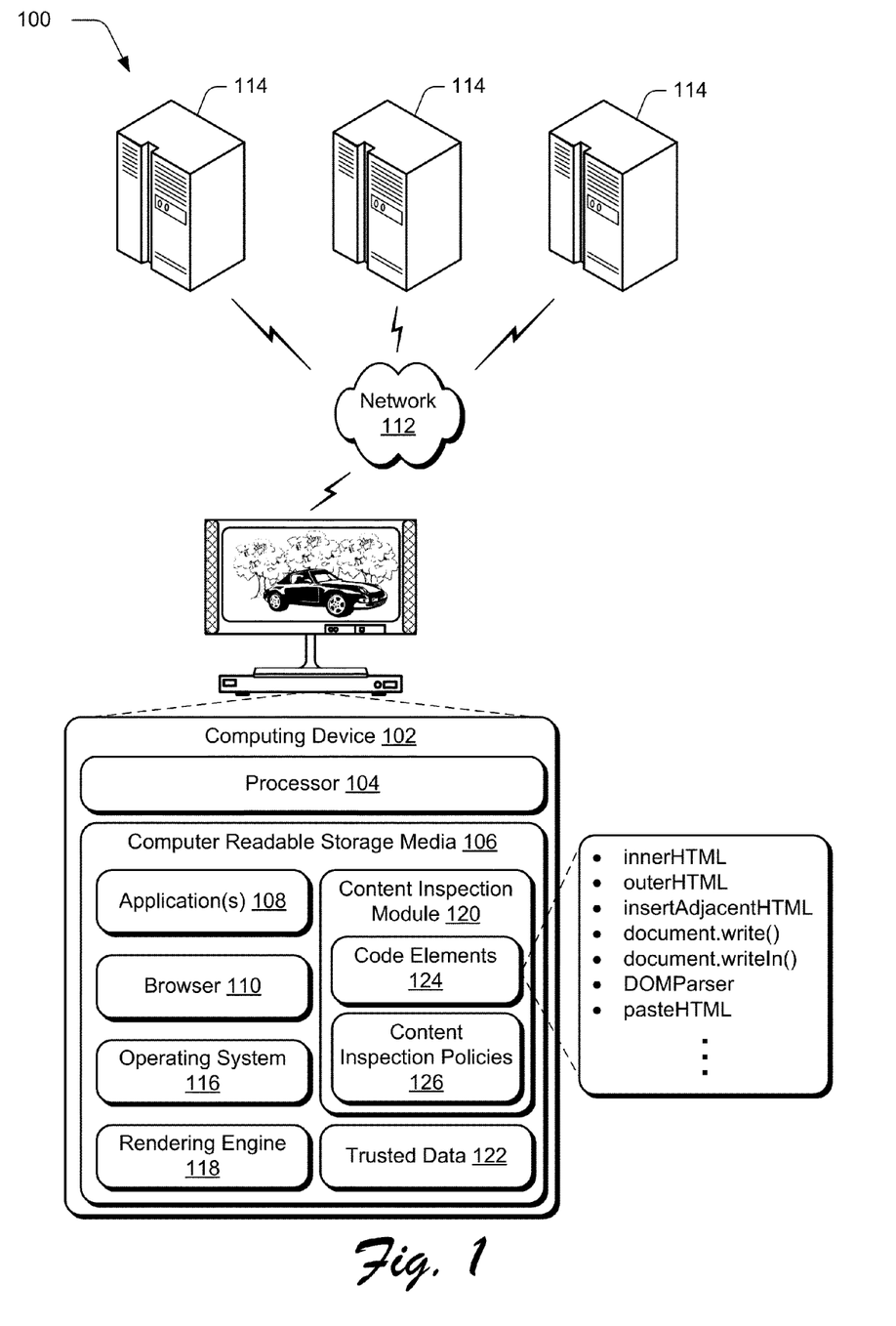
FIG. 1 is an illustration of an environment in an example implementation that is operable to employ content inspection techniques.

FIG. 1 is an illustration of an environment 100 in an example implementation that is operable to employ content inspection techniques. Environment 100 includes a computing device 102 having one or more processors 104, one or more computer-readable storage media 106 and one or more applications 108 that reside on the computer-readable storage media 106 and which are executable by the processor 104. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 4 and 5.

The computing device 102 of FIG. 1 is also illustrated as including a browser 110, e.g., a web browser, which is representative of functionality that is configured to navigate via a network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser 110, for instance, may be configured to navigate via the network 112 to interact with content available from one or more web resources 114 as well as communicate data to the one or more web resources 114, e.g., perform downloads and uploads. The web resources 114 may include any suitable computing resource that is configured to provide content that is accessible via the network 112. Examples of such content include web pages, text content, video, audio, and so on.

One or more of the applications 108 may also be configured to access the network 112, e.g., directly themselves and/or through the browser 110. For example, one or more of the applications 108 may be configured to access one or more of the web resources 114 to retrieve and/or upload content. Thus, the applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with content in a variety of ways from a variety of different sources.

Further illustrated as part of the computing device 102 are an operating system 116 and a rendering engine 118. The operating system 116 is representative of functionality to manage resources of the computing device 102 and provide access to functionalities of the computing device 102. The rendering engine 118 is representative of functionality to process content and formatting information to enable content to be displayed via the computing device 102. In implementations, the rendering engine 118 may receive content from the applications 108 and/or the browser 110 and process the content for display.

The computing device 102 in the illustrated example is also shown as including a content inspection module 120. The content inspection module 120 is representative of functionality of the computing device 102 to inspect content that is requested and/or retrieved by the computing device 102, e.g., via the applications 108 and/or the browser 110. In one or more implementations, the content inspection module 120 is configured to determine if content is trusted or untrusted. If the content is untrusted, the content inspection module 120 may inspect content to determine if the content is safe before allowing the content to undergo further processing via functionalities of the computing device 102.

The computing device 102 is further illustrated as including trusted data 122, which is representative of data that is known to the computing device 102 as content that may be trusted and/or as content received from a trusted source. In one or more implementations, the content inspection module 120 may be configured to determine whether content may be trusted based on a source of the content. For example, if content is received from a source that is internal to the computing device 102 (e.g., from the trusted data 122), the content inspection module 120 may discern that the content may be trusted. Further, if content is received from a source that is external and/or unknown to the computing device 102 (e.g., from one of the web resources 114), the content inspection module 120 may discern that the content is untrusted.

As illustrated in FIG. 1, the content inspection module 120 includes code elements 124. The code elements 124 are representative of identifiers for one or more code elements that can be accessed by the applications 108 and the browser 110 to perform one or more tasks via the computing device 102. Examples of a code element include a function, a subroutine, a method, a parameter, a property, an interface (e.g., an application programing interface (API)), and so on. In one or more implementations, a particular code element identified by the code elements 124 can provide access to functionalities of the computing device 102, such as functionalities provided by the operating system 116 and/or the rendering engine 118. The code elements listed as part of the code elements 124 are presented for purposes of example only, and it is to be appreciated that any code element can be included as part of the code elements 124.

In implementations, the content inspection module 120 can include criteria for determining if a code element is to be included as part of the code elements 124. For example, the content inspection module 120 can specify that if a particular code element may enable content to access and/or manipulate document object model (DOM) functionality of the computing device 102 (e.g., HTML DOM functionality associated with the browser 110), the particular code element is to be included as part of the code elements 124.

Additionally, the content inspection module 120 may be configured to determine whether untrusted content may access one of the code elements identified in the code elements 124. For instance, the content inspection module 120 may determine that one of the applications 108 is calling one of the code elements 124 and that the call to the code element includes a reference to untrusted content. In response to this determination, the content inspection module 120 may inspect the untrusted content to determine if the untrusted content is safe or unsafe.

Further, if the content inspection module 120 determines that untrusted content is unsafe, the content inspection module 120 may prevent the untrusted content from being passed to a particular code element of the code elements 124. Conversely, if the untrusted content is determined to be safe, the content inspection module 120 may allow the untrusted content to be passed to the particular code element.

The content inspection module 120 may also include content inspection policies 126 that may be used by the content inspection module 120 to determine if content (e.g., untrusted content) is safe or unsafe. For example, the content inspection policies 126 may specify that if content meets one or more criteria, the content is considered to be unsafe. In one or more implementations, the content inspection policies 126 may specify that if untrusted content includes executable code (e.g., script) that may be executed by and/or on the computing device 102, the untrusted content is unsafe. Such executable code, when executed, may enable unauthorized access to portions of the computing device 102, such as functionalities of the operating system 116, functionalities of the rendering engine 118, private information associated with a user of the computing device 102, and so on.

While implementations are discussed herein with respect to unsafe content including executable code, it is to be appreciated that the content inspection policies 126 can include a variety of different criteria and filters that may be used to determine if content is safe or unsafe. For example, other criteria that the content inspection policies 126 may use to determine if content is unsafe include indications of particular web sites, content types, file types, web domains, and so on, that are considered unsafe.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment in which the techniques described herein may operate, consider now a discussion of some example procedures in accordance with one or more embodiments.

Example Procedures

The following discussion describes content inspection techniques that may be implemented utilizing the systems and devices described herein. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Further, an operation shown with respect to a particular procedure may be combined and/or interchanged with an operation of a different procedure in accordance with one or more implementations. In portions of the following discussion, reference will be made to the environment 100 of FIG. 1.

Figure 2:
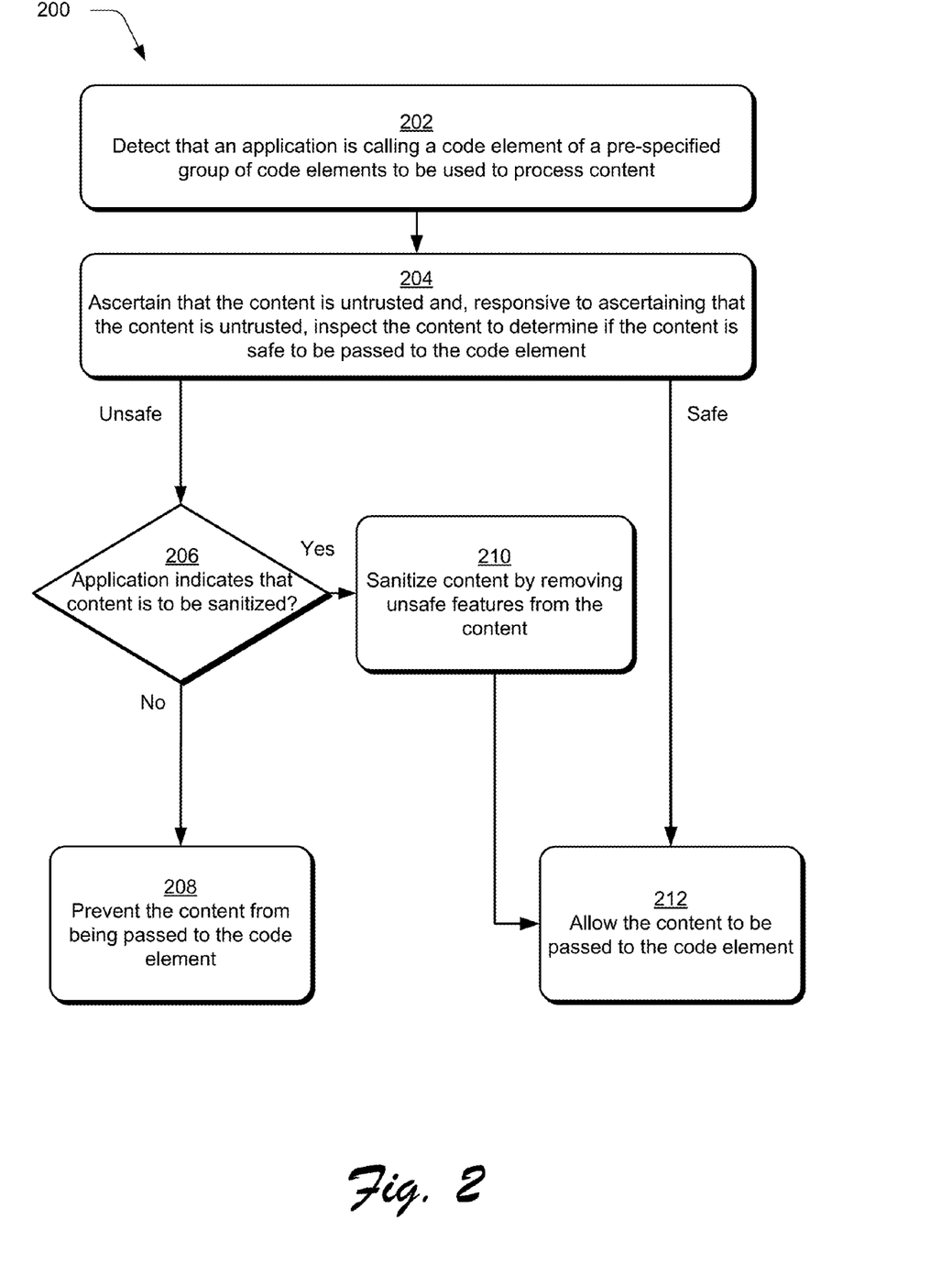
FIG. 2 is a flow diagram depicting a procedure in an example implementation in which content is inspected to determine if the content is unsafe.

FIG. 2 depicts a procedure 200 in an example implementation in which content is inspected to determine if the content is unsafe. It is detected that an application is calling a code element of a pre-specified group of code elements to be used to process content (block 202). The content inspection module 120, for instance, may detect that the application 108 is calling a code element that is included as part of the code elements 124. In implementations, the application 108 may execute a call to a code element that references an instance of content, e.g., content that is local to the computing device 102 and/or content that is remote from the computing device 102. The call to the code element may instruct that the instance of content be passed to the code element to be output via the computing device 102, e.g., as part of a graphical interface for the browser 110.

It is ascertained that the content is untrusted and, responsive to ascertaining that the content is untrusted, the content is inspected to determine if the content is safe or unsafe (block 204). For example, the computing device 102 can ascertain that the content is untrusted based on the source of the content being remote from the computing device 102 and/or having unknown or unverified security credentials, such as one of the web resources 114. In implementations, the content may be determined to be unsafe based on the content including unsafe features such as executable code, as discussed above. For instance, the content inspection module 120 may ascertain that the application includes a script tag that references script content that is untrusted, e.g., script content from an unknown source.

If the content is determined to be unsafe ("Unsafe"), it is determined if the application indicates that the content is to be sanitized (block 206). In implementations, an application can indicate that unsafe content may be sanitized by removing unsafe aspects of the content prior to allowing the content to be passed to a particular code element. For example, the application 108 can specify in its code (e.g., via a function call) that unsafe content is to be passed to the content inspection module 120, which can then remove unsafe features of the content.

If the application does not indicate that the unsafe content is to be sanitized ("No"), the unsafe content is prevented from being passed to the code element (block 208). Further to one or more implementations, the content inspection module 120 may block the unsafe content from being passed to one of the code elements 124 and may cause a message to be presented indicating that access to the code element is denied.

If the application indicates that the content is to be sanitized ("Yes"), the content is sanitized by removing unsafe features from the content (block 210). For instance, if the content includes executable script that is deemed to be unsafe, script tags and/or other script-related features of the content can be removed such that the script is no longer executable when it is passed to a particular code element. The content is then allowed to be passed to the code element (block 212).

Returning to block 204, if the content is determined to be safe ("Safe"), the content is allowed to be passed to the code element (block 212). In one or more implementations, safe content may include content that does not include executable code. For example, safe content may include static content such as images, text, audio, video, presentation data, static hypertext markup language (HTML), and so on. Additionally or alternatively, safe content may include unsafe content that has been sanitized to remove unsafe features.

Although not illustrated here, if the content if determined to be safe, the code element may then be executed using the safe content. For example, executing the code element using the safe content may cause the content to be presented as part of a web page, a document, a visual presentation, and so on.

Figure 3:
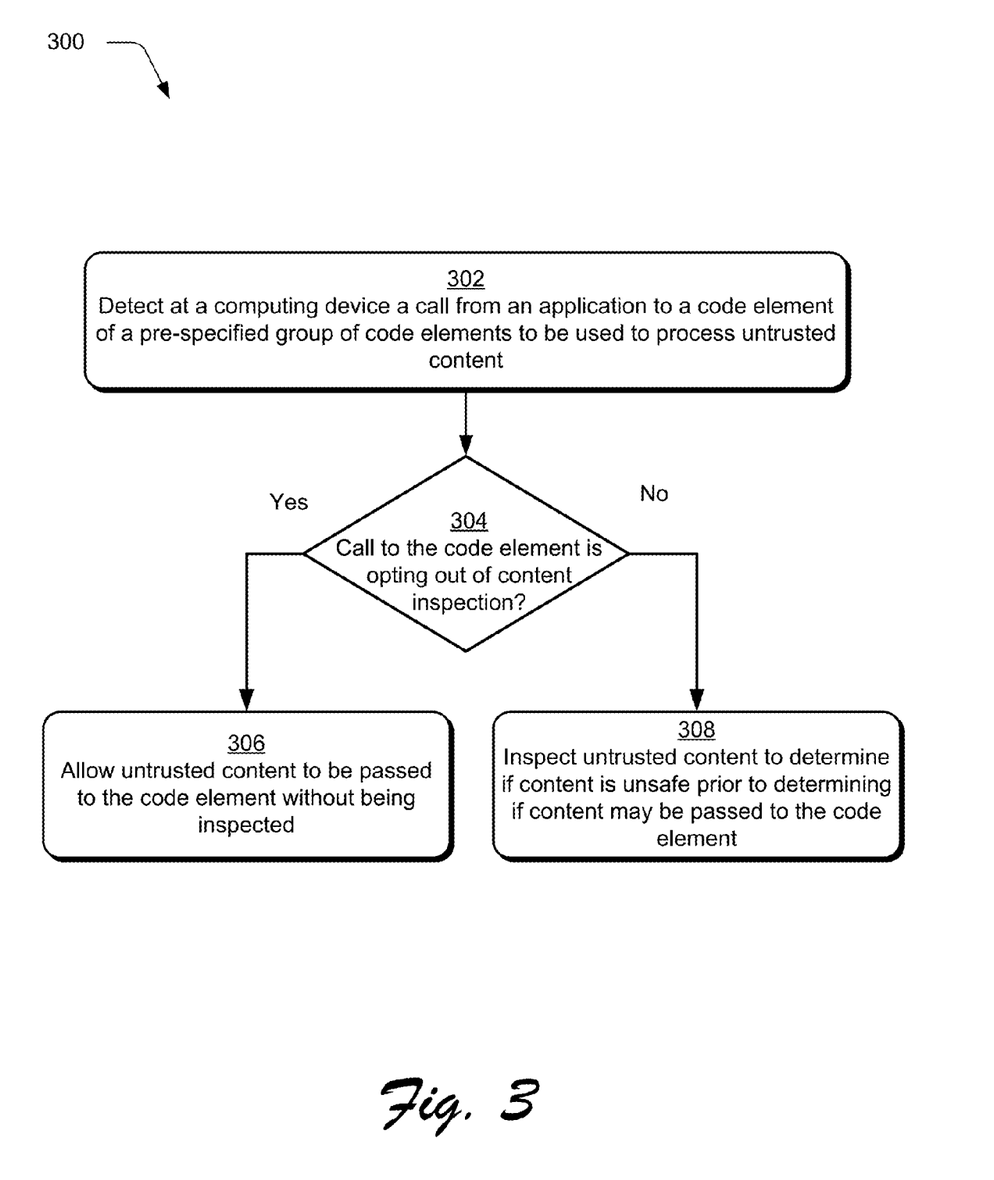
FIG. 3 is a flow diagram depicting a procedure in an example implementation in which a call to a code element may opt out of content inspection.

FIG. 3 depicts a procedure 300 in an example implementation in which a call to a code element may opt out of content inspection. A call is detected at a computing device from an application to a code element of a pre-specified group of code elements to be used to process untrusted content (block 302). For example, the content inspection module 120 can detect that one of the applications 108 is calling one of the code elements 124 to be executed using untrusted content, e.g., content from one of the web resources 114.

It is determined whether the call to the code element is opting out of content inspection (block 304). In one or more implementations, computer code that includes the call to the code element (e.g., as part of the application 108) can include instructions to bypass content inspection even if the call to the code element references content that is untrusted. If the call to the code element is opting out of content inspection ("Yes"), the untrusted content is allowed to be passed to the code element without being inspected (block 306).

Alternatively, if the call to the code element is not opting out of content inspection ("No"), the untrusted content is inspected to determine if the untrusted content is unsafe prior to determining if the untrusted content may be passed to the code element (block 308). As discussed above, if the untrusted content is determined to be unsafe, the untrusted content can be blocked from being passed to the code element or can be sanitized prior to be being passed to the code element.

Example System and Device

Figure 4:
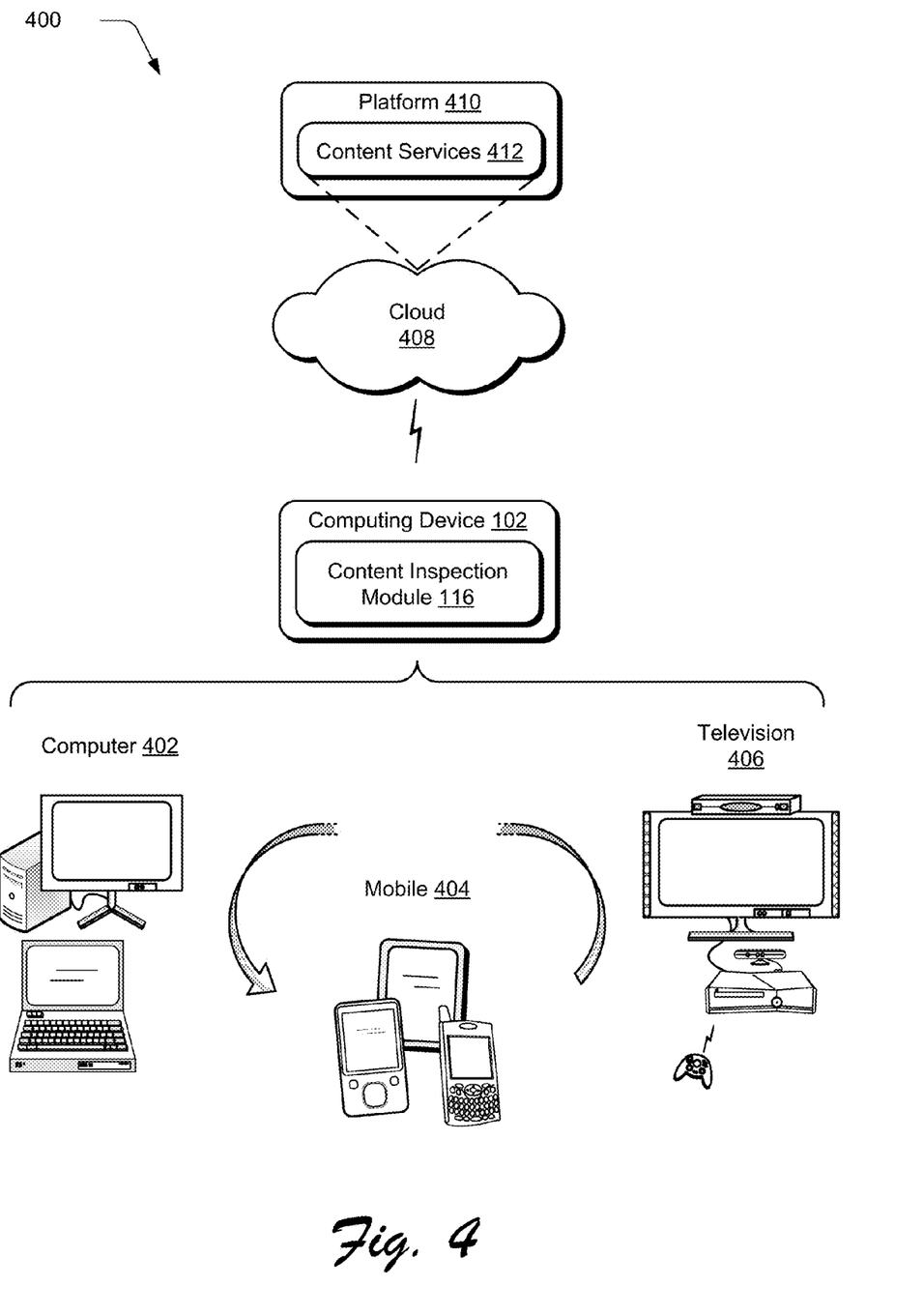
FIG. 4 illustrates an example system that includes the computing device as described with reference to FIGS. 1 and 5.

FIG. 4 illustrates an example system 400 that includes the computing device 102 as described with reference to FIG. 1. The example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 402, mobile 404, and television 406 uses. Each of these configurations includes devices that may have generally different constructs and capabilities, and thus the computing device 102 may be configured according to one or more of the different device classes. For instance, the computing device 102 may be implemented as the computer 402 class of a device that includes a personal computer, desktop computer, a multi-screen computer, laptop computer, netbook, and so on.

The computing device 102 may also be implemented as the mobile 404 class of device that includes mobile devices, such as a mobile phone, portable music player, portable gaming device, a tablet computer, a multi-screen computer, and so on. The computing device 102 may also be implemented as the television 406 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 408 includes and/or is representative of a platform 410 for content services 412. The platform 410 abstracts underlying functionality of hardware (e.g., servers) and software resources of the cloud 408. The content services 412 may include applications and/or data that can be utilized while computer processing is executed on servers that are remote from the computing device 102. Content services 412 can be provided as a service over the Internet and/or through a subscriber network, such as a cellular or Wi-Fi network.

The platform 410 may abstract resources and functions to connect the computing device 102 with other computing devices. The platform 410 may also serve to abstract scaling of resources to provide a corresponding level of scale to encountered demand for the content services 412 that are implemented via the platform 410. Accordingly, in an interconnected device embodiment, implementation of functionality of the functionality described herein may be distributed throughout the system 400. For example, the functionality may be implemented in part on the computing device 102 as well as via the platform 410 that abstracts the functionality of the cloud 408, as shown through inclusion of the content inspection module 120.

Figure 5:
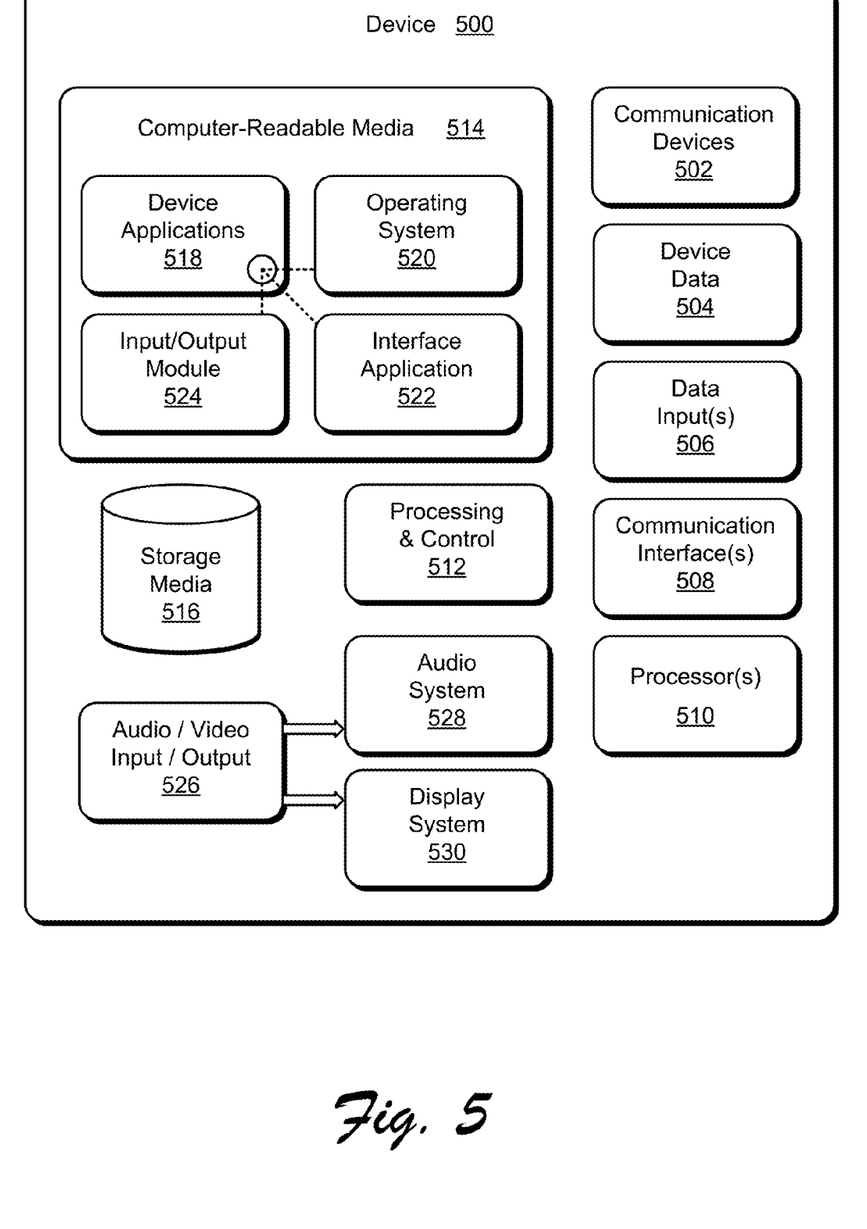
FIG. 5 illustrates various components of an example device that can be implemented as any type of portable and/or computer device as described with reference to FIGS. 1 and 4 to implement embodiments of the techniques described herein.

FIG. 5 illustrates various components of an example device 500 that can be implemented as any type of computing device as described with reference to FIGS. 1 and 4 to implement embodiments of the techniques described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of the techniques described herein. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of the techniques described herein.

In this example, the device applications 518 include an interface application 522 and an input/output module 524 that are shown as software modules and/or computer applications. The input/output module 524 is representative of software that is used to provide an interface with a device configured to capture inputs, such as a touchscreen, track pad, camera, microphone, and so on. Alternatively or in addition, the interface application 522 and the input/output module 524 can be implemented as hardware, software, firmware, or any combination thereof. Additionally, the input/output module 524 may be configured to support multiple input devices, such as separate devices to capture visual and audio inputs, respectively.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
   detecting, by a computing device, that an application is calling a code element of a pre-specified group of code elements to be used to process content that is separate from the application;
   responsive to the detecting, determining whether the content to be processed is untrusted; and
   responsive to ascertaining that the content is trusted based on a source of the content being local to the computing device on which the application is executing, allowing the trusted content to be passed to the code element; and
   responsive to ascertaining that the content is untrusted based on the source of the content being remote to the computing device on which the application is executing, inspecting the content separately from the code element to determine if the content is safe to be passed to the code element, the inspecting being performed subsequent to determining whether the content to be processed is untrusted and including identifying whether the content itself includes one or more unsafe criteria.

2. A method as described in claim 1, wherein the code element is included as part of the pre-specified group of code elements based on the code element enabling access to particular functionalities of a computing device.

3. A method as described in claim 1, wherein the code element comprises at least one of a function, a subroutine, a method, a parameter, a property, or an application programing interface (API).

4. A method as described in claim 1, wherein ascertaining that the content is untrusted is further based at least in part on the source of the content being unknown to the computing device on which the application is executing.

5. A method as described in claim 1, wherein ascertaining that the content is untrusted is further based on the application including a script tag that indicates that the content is to be retrieved from a resource that is remote from the computing device on which the application is executing.

6. A method as described in claim 1, wherein inspecting the content further comprises applying one or more content inspection policies to the content to determine if the content is safe to be passed to the code element, the one or more content inspection policies indicating that if the content meets one or more criteria the content is considered to be unsafe.

7. A method as described in claim 1, wherein inspecting the content includes determining that the content is unsafe to be passed to the code element based on the content including executable code.

8. A method as described in claim 7, further comprising:
responsive to ascertaining that the content is unsafe, sanitizing the unsafe content by removing the executable code from the content; and
allowing the sanitized content to be passed to the code element.

9. A method as described in claim 1, further comprising preventing the content from being passed to the code element based on a determination from the inspecting that the content is unsafe.

10. A method as described in claim 1, wherein the code element is included as part of the pre-specified group of code elements based on the code element enabling access to document object model (DOM) functionality of a computing device.

11. A method, comprising:
detecting, by a computing device, that an application is calling a pre-specified code element to be used to process content that is separate from the application;
responsive to the detecting, ascertaining, by the computing device, whether the content is trusted or untrusted to be passed to the pre-specified code element, the ascertaining being based on a source of the content;
responsive to ascertaining that the content is trusted based on the source of the content being local to the computing device, allowing the trusted content to be passed to the pre-specified code element; and
responsive to ascertaining that content is untrusted based on the source of the content being remote to the computing device:
inspecting the untrusted content separately from the pre-specified code element to determine that the untrusted content is unsafe to be passed to the pre-specified code element; and
sanitizing the unsafe content by removing one or more unsafe features from the untrusted content itself prior to allowing the sanitized content to be passed to the pre-specified code element.

12. A method as described in claim 11, wherein ascertaining that the content is untrusted is further based on the source of the content including unknown or unverified security credentials.

13. A method as described in claim 11, wherein the one or more unsafe features comprise executable code, and wherein the removing comprises removing the executable code from the content.

14. A method as described in claim 11, wherein the one or more unsafe features comprise a script tag, and wherein the removing comprises removing the script tag from the content.

15. A method as described in claim 11, wherein the pre-specified code element comprises at least one of a function, a subroutine, a method, a parameter, a property, or an application programing interface (API).

16. A system, comprising:
one or more processors;
one or more computer-readable storage media storing instructions that, responsive to execution by the one or more processors, cause a computing device to perform operations comprising:
detecting that an application is calling a code element of a pre-specified group of code elements to be used to process content that is separate from the application;
ascertaining whether the content is trusted or untrusted to be passed to the code element, the ascertaining being based on a source of the content;
responsive to ascertaining that the content is trusted content based on the source of the content being internal to the computing device, allowing the trusted content to be passed to the code element; and
responsive to ascertaining that the content is untrusted content based on the source of the content being external to the computing device:
inspecting the untrusted content separately from the code element to determine that the untrusted content is unsafe to be passed to the code element; and
sanitizing the unsafe content by removing one or more unsafe features from the untrusted content itself prior to allowing the sanitized content to be passed to the code element.

17. A system as described in claim 16, further comprising pre-specifying, prior to the detecting, a set of code elements on the computing device.

18. A system as described in claim 17, wherein pre-specifying the set of code elements is based, at least in part, on whether a code element of the set of code elements enables access to security-sensitive functionalities of the computing device.

19. A system as described in claim 16, wherein the one or more unsafe features includes a script with an executable portion and wherein removing the one or more unsafe features from the untrusted content includes removing the executable portion from the script prior to passing the script to the code element.

20. A system as described in claim 16, the operations further comprising, responsive to sanitizing the unsafe content:
determining that the sanitized content is safe content; and
causing presentation of the safe content as a web page, a document, or a visual presentation.

* * * * *